Oct. 29, 1929.  T. V. S. DORSEY  1,733,529
NUT LOCK
Filed Oct. 17, 1928
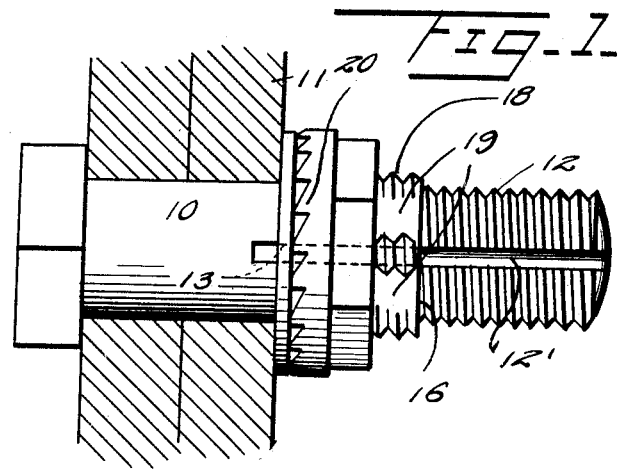
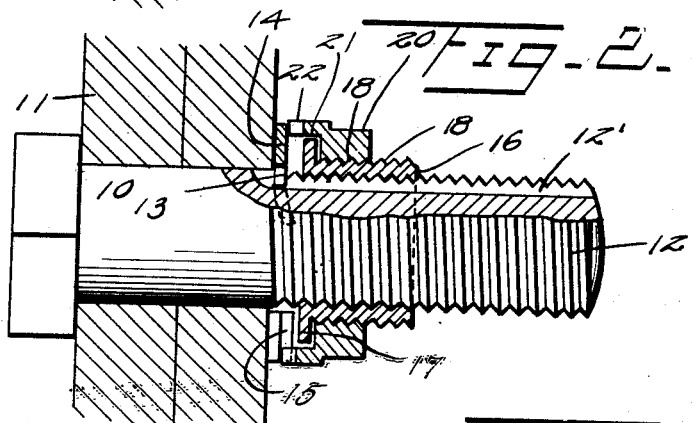
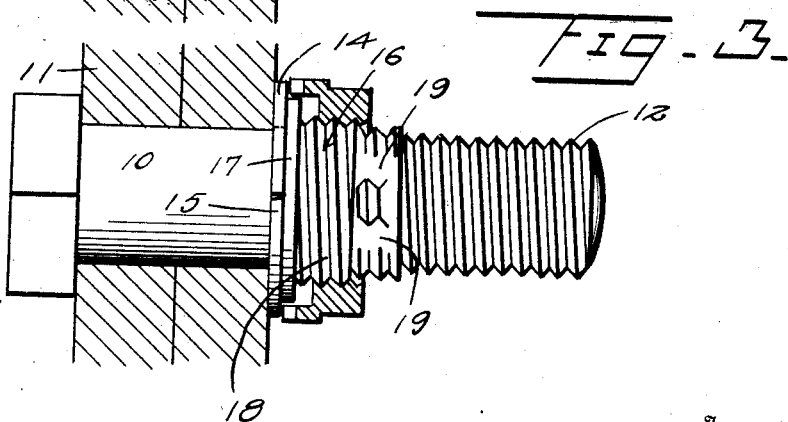
Inventor
T. V. S. Dorsey
By
Attorney Patented Oct. 29, 1929

1,733,529

UNITED STATES PATENT OFFICE

THOMAS V. S. DORSEY, OF LOCKPORT, LOUISIANA, ASSIGNOR OF FIFTY-ONE PER CENT TO LOUIS E. DAVIET

NUT LOCK

Application filed October 17, 1928. Serial No. 313,156.

This invention relates to new and useful improvements in locking devices, and particularly to devices for locking nuts and bolts.

One object of the invention is to provide a nut lock wherein a nut and washer cooperate to prevent the retrograde rotation of the nut and bolt.

Another object is to provide a nut lock which includes means cooperating with the nut to permit the nut to be locked in engagement with a washer, such means being operable to release the washer whereby to permit easy and quick removal of the nut.

Other objects and advantages will be apparent from the following description when taken in connection with the accompanying drawing.

In the drawing:

Figure 1 is an elevation of a bolt engaged through a piece of work and having the improved locking means thereon.

Figure 2 is an enlarged vertical longitudinal central sectional view through the locking device, and a portion of the bolt.

Figure 3 is a side elevation of the device, showing the means for releasing the washer pawl from the teeth of the nut, whereby to permit the nut being removed.

Referring particularly to the accompanying drawing, 10 represents a bolt which is disposed through the work 11, such bolt having a threaded portion 12 formed with a longitudinal groove 12'. Engaged on the bolt, and having an internal lug or tongue 13, engaging in said groove, is a washer 14, said washer being split and having one end of the split turned out of the plane of the washer to form a spring locking tooth or pawl 15. Threaded on the bolt is a sleeve 16, the inner end of which is formed with a peripheral flange 17, such sleeve being externally threaded, as indicated at 18. The outer end of the sleeve is formed with a plurality of faces 19, with which a wrench may be engaged to turn said sleeve. Threaded on the sleeve 16 is the nut 20, which is formed with a cavity or recess 21, in its inner face, and has a series of ratchet teeth 22, surrounding said recess, such teeth being arranged to engage with the before-mentioned tooth or pawl 15, of the washer 14, for the purpose of preventing retrograde rotation of the nut, when once screwed up tightly against the washer.

It will be noted that the diameter of the flange 17, of the sleeve 16 is such that it readily fits within the recess of the nut.

In the operation of the device, the bolt is first passed through the work, and then the washer slipped on the bolt until it rests against the face of the work. The sleeve 16 is then screwed on the bolt, and the nut 20 screwed on the sleeve. The nut is turned up until its teeth engage with the pawl of the washer, it being noted that the sleeve is first screwed up until the flanged end thereof is in close proximity to the washer, but not contacting therewith, so that when the nut is further turned up, for the efficient locking thereof with the washer, the said flanged end of the sleeve will lie within the recess of the nut. The proper engagement of the nut with the pawl of the washer uncovers the wrench engaging faces of the sleeve, as will be readily seen upon inspection of the drawing.

When it is desired to remove the nut, a wrench is engaged with the said faces of the sleeve and said sleeve turned inwardly until the flanged end thereof flexes the pawl, or end of the washer into the plane thereof, or to such a degree as to free said pawl from the teeth of the nut, when the operator may easily and quickly unscrew the nut. The nut and sleeve may then be easily unscrewed from the bolt, to permit removal of the bolt from the work.

What is claimed is:

1. In a nut locking device, the combination with a bolt having a longitudinally grooved threaded portion and a split spring washer on the bolt having a tongue engaged in said groove, of a sleeve engaged on the bolt having a flange on its inner end, and a nut threaded on the sleeve having a recess receiving said flange whereby said flange is out of engagement with the washer, said nut being provided with teeth engaging an end of the washer.

2. In a nut locking device, the combination with a bolt having a threaded portion formed with a longitudinal groove, and a split spring washer on the bolt having a tongue engaged in said groove, of an internally and externally threaded sleeve engaged on the bolt having wrench faces on its outer end and a flange on its inner end, and a nut engaged on the sleeve enclosing said flange and having teeth for engagement with the washer, said sleeve being adapted to be turned inwardly whereby to cause the flange thereof to engage and flex the washer out of engagement with the teeth of the nut.

3. In a nut locking device, the combination with a bolt carried spring washer, of a sleeve engaged on the bolt and having internal and external threads, the inner end of the sleeve having a peripheral flange, the outer end of the sleeve having wrench faces, and a nut engaged on the sleeve having teeth for engagement with the washer and having a recess receiving said flange when the parts are in operative position, said sleeve being adapted to be screwed inwardly to flex the washer out of engagement with the nut, whereby to permit the nut to be unscrewed.

In testimony whereof, I affix my signature.

THOMAS V. S. DORSEY.